US010253696B2

(12) United States Patent
Alecu et al.

(10) Patent No.: US 10,253,696 B2
(45) Date of Patent: Apr. 9, 2019

(54) AIR COOLED AIR COOLER FOR GAS TURBINE ENGINE AIR SYSTEM

(71) Applicant: PRATT & WHITNEY CANADA CORP., Longueuil (CA)

(72) Inventors: Daniel Alecu, Brampton (CA); Richard Kostka, Bolton (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 241 days.

(21) Appl. No.: 15/258,236

(22) Filed: Sep. 7, 2016

(65) Prior Publication Data

US 2017/0002741 A1 Jan. 5, 2017

Related U.S. Application Data

(62) Division of application No. 13/684,863, filed on Nov. 26, 2012, now Pat. No. 9,458,764.

(51) Int. Cl.
*B21K 25/00* (2006.01)
*F02C 7/18* (2006.01)
*F02C 7/14* (2006.01)

(52) U.S. Cl.
CPC .............. *F02C 7/185* (2013.01); *B21K 25/00* (2013.01); *F02C 7/14* (2013.01); *F02C 7/18* (2013.01); *F05D 2220/32* (2013.01); *F05D 2230/23* (2013.01); *F05D 2260/213* (2013.01); *Y02T 50/671* (2013.01); *Y02T 50/675* (2013.01); *Y10T 29/4935* (2015.01)

(58) Field of Classification Search
CPC .... F02C 7/185; F02C 7/18; F02C 7/14; F05D 2260/213; F05D 2230/23; B21K 25/00
See application file for complete search history.

(56) References Cited

U.S. PATENT DOCUMENTS

| | | |
|---|---|---|
| 2,653,585 A | 9/1953 | Wallace |
| 3,058,302 A | 10/1962 | Kuzyk |
| 4,128,769 A | 12/1978 | Bons et al. |
| 4,351,150 A | 9/1982 | Schulze |
| 5,402,938 A | 4/1995 | Sweeney |

(Continued)

OTHER PUBLICATIONS

"Feeler Gauge", Collins English Dictionary—Complete and Unabridged, HarperCollins Publishers 2003; http://www.thefreedictionary.com/Feeler+gauge, initially viewed Feb. 19, 2015 at 8:23 PM; 1 page.*

*Primary Examiner* — Steven Sutherland
(74) *Attorney, Agent, or Firm* — Norton Rose Fulbright Canada LLP

(57) ABSTRACT

An air-to-air cooler has a heat exchanger integrated to a housing. A first passage extends through the housing for directing a flow of cooling air through the heat exchanger. A second passage extends through the housing for directing a flow of hot air to be cooled through the heat exchanger. The first passage has a cooling air outlet tube disposed downstream of the heat exchanger. The cooling air outlet tube extends across the second passage between the heat exchanger and a hot air inlet of the second passage. The hot air inlet is disposed to cause incoming hot air to flow over the cooling air outlet tube upstream of the heat exchanger. An ejector drives the flow of cooling air through the first passage of the air-to-air cooler. A portion of the hot air flow may be used to drive the ejector.

8 Claims, 5 Drawing Sheets

(56) References Cited

U.S. PATENT DOCUMENTS

| | | |
|---|---|---|
| 5,423,374 A | 6/1995 | Miller et al. |
| 5,655,359 A | 8/1997 | Campbell et al. |
| 5,987,877 A | 11/1999 | Steiner |
| 6,092,360 A | 7/2000 | Hoag et al. |
| 6,134,878 A | 10/2000 | Amako et al. |
| 6,282,881 B1 | 9/2001 | Beutin et al. |
| 6,651,929 B2 | 11/2003 | Dionne |
| 6,942,181 B2 | 9/2005 | Dionne |
| 7,152,410 B2 | 12/2006 | Sheoran et al. |
| 7,231,767 B2 | 6/2007 | Whiting |
| 7,337,605 B2 | 3/2008 | Hagshenas |
| 7,364,117 B2 | 4/2008 | Dionne |
| 7,568,336 B2 | 8/2009 | Brault et al. |
| 7,698,896 B2 | 4/2010 | Sheoran et al. |
| 7,861,512 B2 | 1/2011 | Olver et al. |
| 2003/0116305 A1 | 6/2003 | Beddome et al. |
| 2009/0107147 A1 | 4/2009 | Piper et al. |

\* cited by examiner

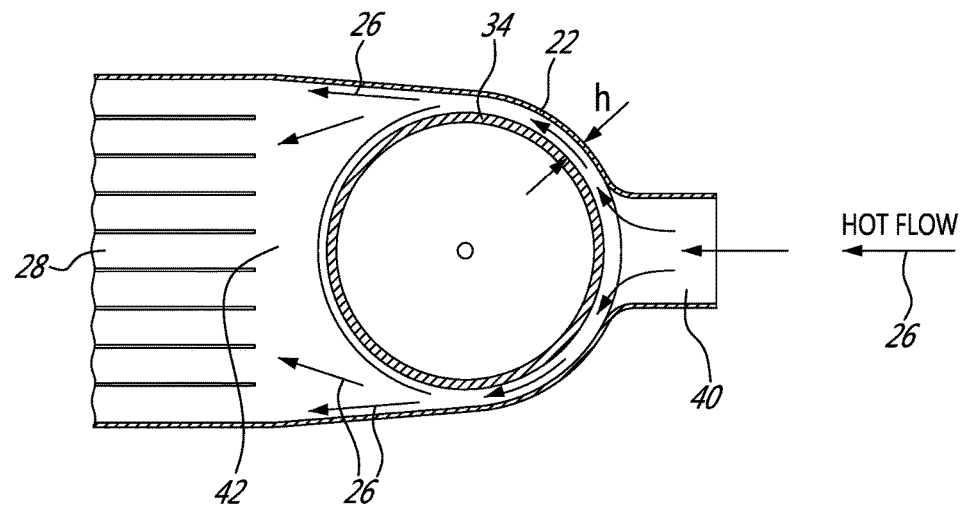
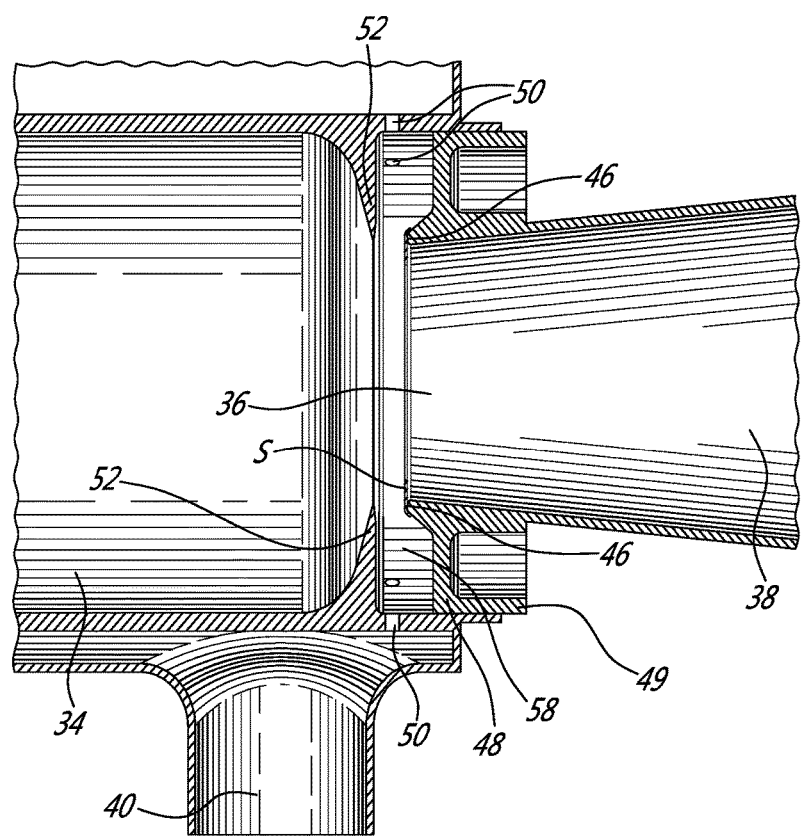

AIR COOLED AIR COOLER FOR GAS TURBINE ENGINE AIR SYSTEM

CROSS REFERENCE TO RELATED APPLICATION

This application is a divisional application of U.S. patent application Ser. No. 13/684,863 filed Nov. 26, 2012, the entire content of which is hereby incorporated by reference.

TECHNICAL FIELD

The application relates generally to air coolers and, more particularly, to an air-to-air cooler for a gas turbine engine air system.

BACKGROUND OF THE ART

Cooling high pressure air, such as compressor bleed air, has always been challenging in the context of a gas turbine engine. The space available to install air coolers and associated air movers within the engine nacelle is limited. Also, the use of air pipes and fans to direct air through a separate heat exchanger adds weight to the engine which is negative from a performance point of a view.

SUMMARY

In one aspect, there is provided an air-to-air cooler for a gas turbine engine, comprising a housing, a heat exchanger matrix integrated to said housing, a first passage extending through said housing for directing a flow of cooling air through said heat exchanger matrix, a second passage extending through said housing for directing a flow of hot air to be cooled through the heat exchanger matrix, the heat exchanger matrix promoting heat transfer from the flow of hot air to the flow of cooling air, the first passage including a cooling air outlet tube disposed downstream of the heat exchanger matrix relative to the flow of cooling air, the cooling air outlet tube extending across said second passage between the heat exchanger matrix and a hot air inlet of said second passage, the hot air inlet being disposed to cause incoming hot air to flow over the cooling air outlet tube upstream of the heat exchanger matrix, and an ejector driving the flow of cooling air through the first passage of the air-to-air cooler.

In a second aspect, there is provided an air-to-air cooler for a gas turbine engine, comprising a housing, a heat exchanger matrix provided in said housing, a first passage extending through said housing and directing a flow of cooling air through said heat exchanger matrix, a second passage extending through said housing and directing a flow of hot air to be cooled through the heat exchanger matrix, the heat exchanger matrix promoting heat transfer from the flow of hot air to the flow of cooling air, and an ejector tapping into the second passage and using a portion of the incoming flow of hot air as a source of motive fluid for driving the flow of cooling air through the first passage.

In a third aspect, there is provided a method of installing an ejector in a pipe having an axis, the pipe having an annular inner shoulder projecting radially inwardly from an inner surface of a wall of the pipe, and a circumferential array of holes extending through the wall of the pipe at an axial location comprised between the inner shoulder and a terminal end of the pipe, the ejector having an axially projecting annular front lip, the method comprising positioning a shim between the inner shoulder and the front lip, the shim having a thickness corresponding to a desired axial gap between the inner shoulder and the front lip, positioning the ejector in the pipe with the shim axially abutting against the inner shoulder and the front lip, securing the ejector in position inside the pipe, and then removing the shim from the pipe.

DESCRIPTION OF THE DRAWINGS

Reference is now made to the accompanying figures, in which:

FIG. 5 is a schematic cross-section of the hot air inlet manifold section of the air cooler shown in FIG. 2, and FIG. 6 is a cross-section view illustrating the ejector in the process of being inserted into the cooling air outlet tube.

DETAILED DESCRIPTION OF THE PREFERRED EMBODIMENTS

Figure 1:
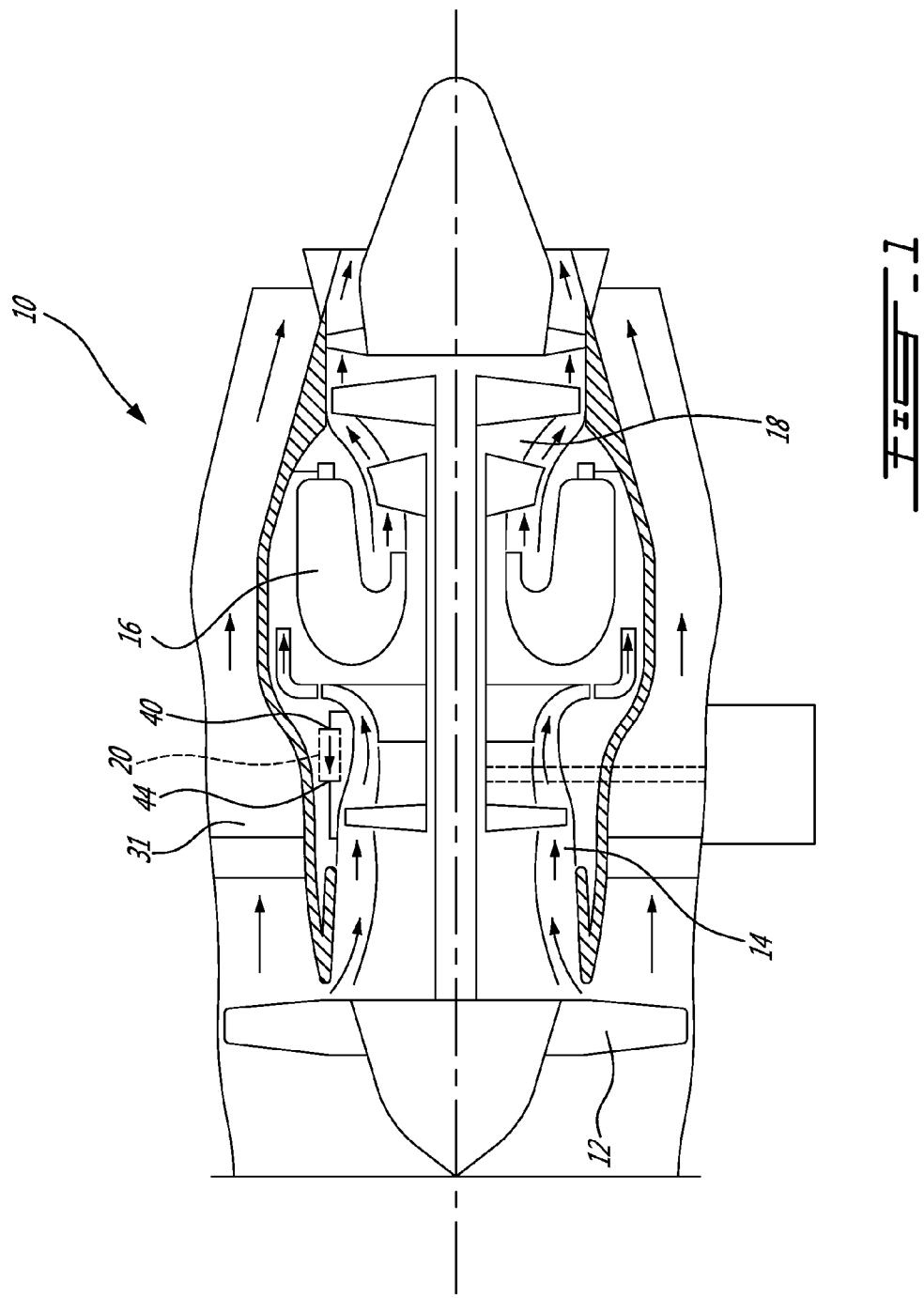
FIG. 1 is a schematic cross-sectional view of a turbofan gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

The gas turbine engine 10 has an air system which, among others, provides air for engine cooling and sealing purposes. The gas turbine engine air system may also be used to pressurize the aircraft cabin or to supply pressurized air to pneumatic devices. Compressor bleed air is typically used as a source of pressurized air for the gas turbine engine air system. However, bleed air from the compressor 14 is relatively hot and as such it is desirable for some applications to first cool the bleed air by passing it through an air-to-air cooler cooled by cold outside air or another suitable source of coolant. The space available to install such air coolers in a gas turbine engine is limited.

FIGS. 2 to 5 illustrate an embodiment of a compact self-contained/autonomous air-to-air cooler 20. As will be seen hereinafter, the proposed configuration allows the installation of an air-to-air cooler in confined or challenging locations. For instance, as shown in FIG. 1, the compactness of the cooler 20 allows it to be installed in line directly on the hot pressurized air ducting within the inner bypass duct of a turbofan engine without the need for additional ducting and ram air scoops or the like.

Figure 2:
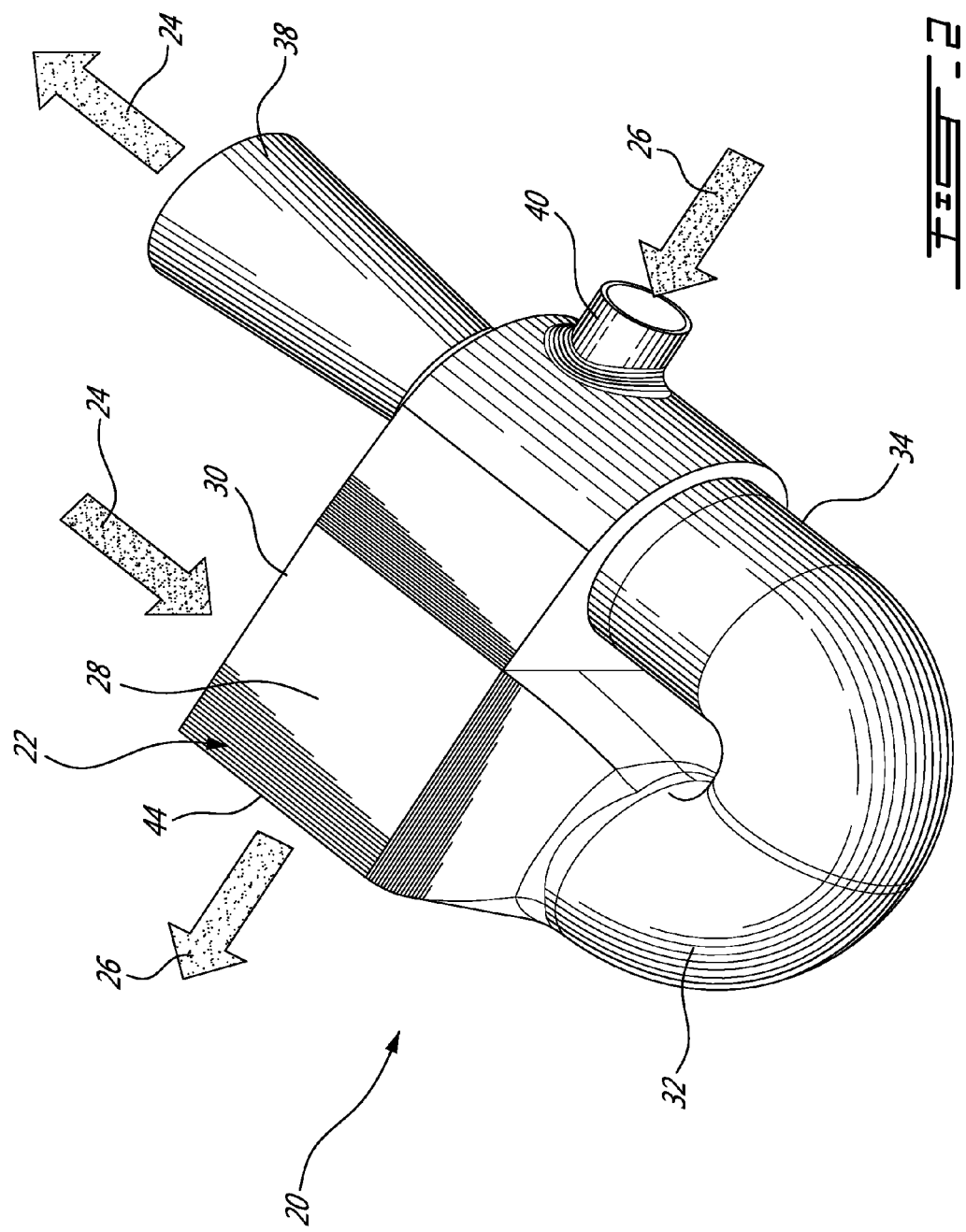
FIG. 2 is an isometric view of an air-to-air cooler forming part of the air system if the gas turbine engine.
Figure 3:
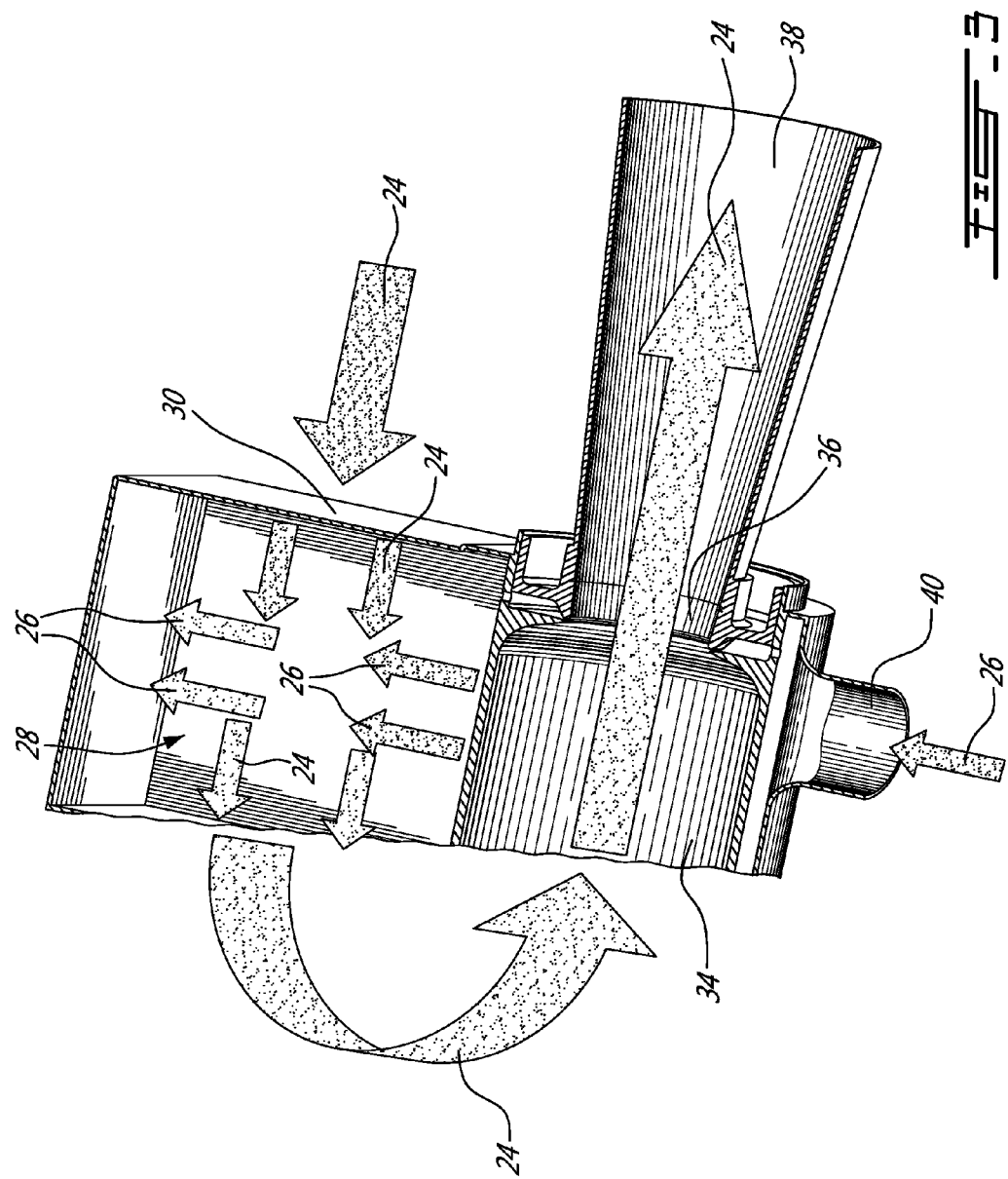
FIG. 3 is an enlarged, broken away, isometric view illustrating some internal details of the air cooler shown in FIG. 2.

Referring concurrently to FIGS. 2 and 3, it can be appreciated that the cooler 20 generally comprises a housing 22 defining a first passage or cooling air circuit (schematically depicted by flow arrows 24 in FIG. 3) and a second passage or hot air circuit (schematically depicted by flow arrows 26). A heat exchanger matrix 28 is provided in the housing 22 to transfer heat from the hot air passing through the second passage 26 to the cooling air flowing through the first passage 24. The heat exchanger matrix 28 may take any suitable forms. For instance, it can be provided in the form of a fin-and-plate heat exchanger or in the form of a conventional tubular heat exchanger. Also, it could have a single pass cross-flow or a multiple pass cross-flow configuration, as well as parallel or counter flow configurations.

The first passage 24 has a cooling air inlet 30 provided on a first side of the housing 22 for directing cooling air through the heat exchanger matrix 28. The cooling air inlet 30 is connected in fluid flow communication with any suitable source of cooling air. For instance, the cooling air inlet 30 may be supplied with fresh outside air or with air from the bypass passage 31 (FIG. 1) of the engine 10. The cooling air inlet 30 may comprise a bell mouth (not shown) to provide for a uniform cold flow distribution through the heat exchanger matrix and, thus, increase the heat exchanger efficiency. The first passage 24 may also comprise an elbow 32 for receiving the cooling air at its exit from the heat exchanger matrix 28 and for directing it into a cooling air outlet pipe 34 mounted inside the housing 22. The elbow 32 may be provided in the form of an external 180° elbow pipe mounted on a side of the housing 22 opposite to that of the cooling air inlet 30. As will be seen herein after, an ejector 36 may be installed in the outlet end of the cooling air outlet pipe 34 for driving the flow of cooling air through the first passage 24, thereby providing for a self-ventilated cooler. A diffuser 38 may be integrated or mounted to the ejector 36 to transform the kinetic energy of the cooling air flow in increased static pressure as the cooling air flow is being expelled out of the cooler 20. When used on a turbofan engine, the exhaust flow may be routed to the engine bypass main flow, thereby reducing the impact on engine specific fuel consumption.

Figure 4:
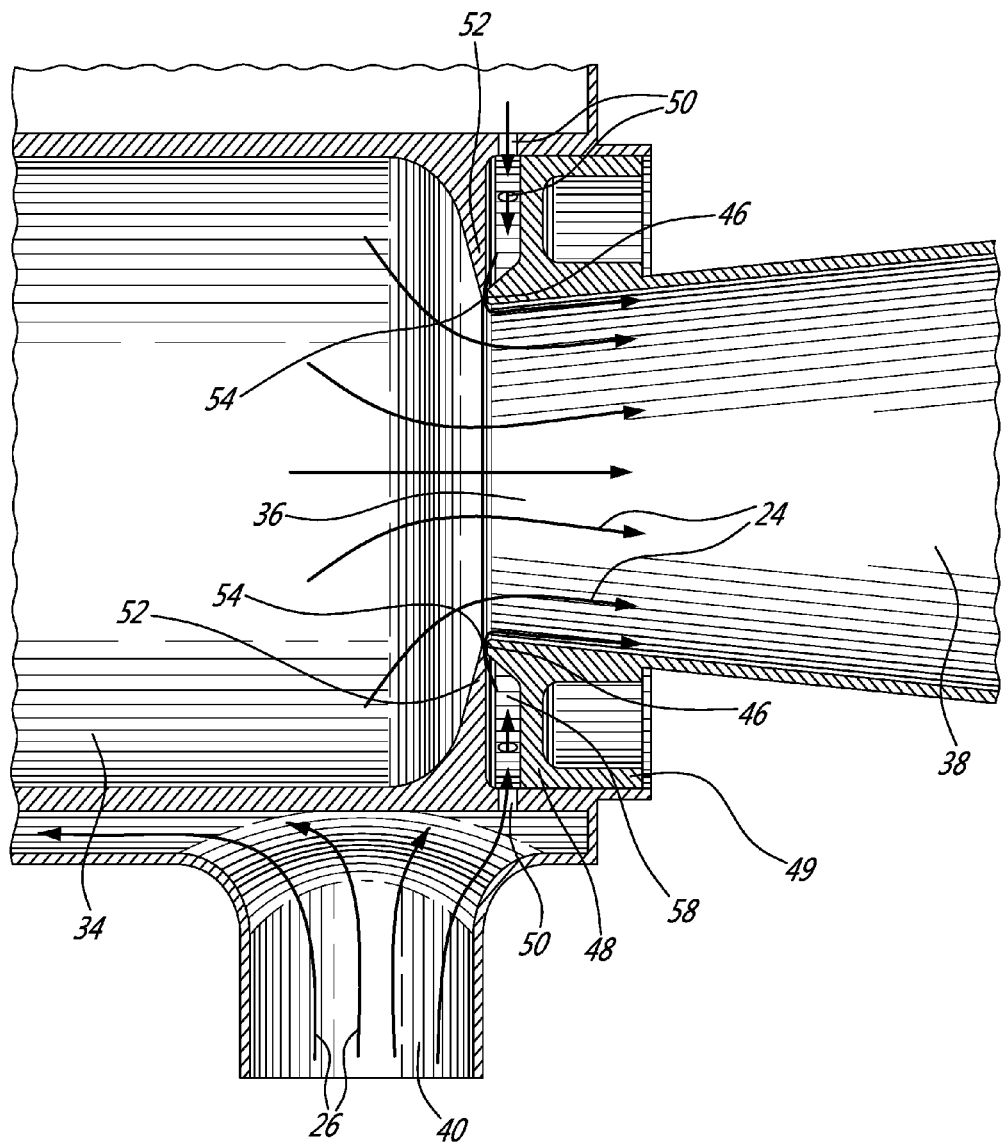
FIG. 4 is an enlarged, broken away, isometric view illustrating how a portion of the incoming hot air to be cooled may be used to drive the flow of cooling air through the air cooler.

The second passage 26 or hot air flow circuit comprises a hot air inlet 40 adapted to be connected in flow communication with a source of hot pressurized air (e.g. compressor bleed air) to be cooled. According to the illustrated embodiment, the cooling air inlet 30 and the hot air inlet 40 are disposed at right angles with respect to each other. Referring concurrently to FIGS. 3 to 5, it can be appreciated that the hot air inlet 40 opens to a plenum 42 (FIG. 5) inside the housing 22. The cooling air outlet tube 34 extends through the plenum 42. As best shown in FIG. 5, an annular gap "h" is defined between the cooling air outlet tube 34 and the wall of the housing 22 surrounding the plenum 42. The annular gap "h" and the hot air inlet 40 communicate together to form the hot air inlet manifold of the second passage 26. One role of the hot air inlet manifold is to uniformly distribute incoming hot air through the heat exchanger matrix 28. From FIGS. 3 to 5, it can also be appreciated that the hot air inlet 40 extends in a same plane as the cooling air outlet tube 34 and is oriented transversally with respect thereto (perpendicularly in the illustrated example). Accordingly, the hot air passing through inlet 40 impinges upon the cooling air outlet tube 34 at its entry into the plenum 42 and thereafter flows over the cylindrical outer surface of the cooling air outlet tube 34 before entering into the heat exchanger matrix 28. The outer surface of the cooling air outlet tube 34 provides a flow distribution and a heat exchange surface for the hot air to be cooled prior to its passage through the heat exchanger matrix 28. After its passage through the gap "h", the hot air flows through the heat exchanger matrix 28 where heat is transferred from the hot air to the cooling air. The cooled air is then discharged from the housing 22 via an outlet 44 (FIG. 1) and directed to its intended point of use.

As mentioned herein before, the flow of cooling air through the first passage 24 is driven by an ejector 36 installed in the cold stream path downstream of the heat exchanger matrix 28. As shown in FIG. 4, the ejector 36 may be mounted inside an outlet end of the cooling air outlet tube 34. The ejector 36 has a circumferentially extending front lip 46 projecting axially forwardly relative to a radially outwardly extending mounting flange 48. The lip 46 circumscribes the cooling air flow inlet of the ejector 36. The mounting flange 48 merges at its outer end into an axially extending cylindrical portion 49 having an outer diameter which is slightly less than an inner diameter of the outlet end portion of the cooling air outlet tube 34. The cylindrical portion 49 may be brazed or otherwise suitably secured to the surrounding wall portion of the cooling air outlet tube 34 once the position of the ejector 36 has been appropriately adjusted as will be described herein after. The cooling air outlet tube 34 has an annular inner shoulder 52 projecting radially inwardly from an inner cylindrical surface thereof. The shoulder 52 and the lip 46 define an axial gap 54. The axial gap 54 is calibrated to form the motive flow inlet of the ejector 36. The axial gap 54 is in flow communication with an annular gap 58 axially bounded by the inner shoulder 52 and the mounting flange 48 and radially by the inner wall of the cooling air outlet tube 34 and the front lip 46 of the ejector 36. The annular gap 58 forms an ejector motive flow manifold for radially inwardly guiding the ejector motive flow to the calibrated axial gap 54. The ejector motive flow manifold is connected in fluid flow communication with a series of air holes 50 defined through the wall of the cooling air outlet tube 34. The air holes 50 may be uniformly circumferentially distributed on the cooling air outlet tube 34. One or more rows of air holes 50 could be provided. As can be appreciated from FIG. 4, the air holes 50 communicate with the hot air inlet manifold inside the housing 22. Accordingly, a portion of the hot air flowing over the cooling air outlet tube 34 can be routed to the ejector 36 to drive the flow of cooling air through the first passage 24 of the air cooler 20. The hot air flows radially inwardly through the air holes 50 and the annular gap 58 to axial gap 54. The hot air follows a tip radius of the lip 46 from the radial direction in the gap 54 to the axial direction downstream from the lip 46, due to the Coanda effect. The motive flow is, thus, provided directly from the hot air stream to be cooled without the need for additional ducting for directing the motive flow. This allows saving weight and avoiding pressure losses.

As mentioned hereinabove, the ejector body may be inserted in the cooling air outlet tube 34 and fastened in position by brazing. As shown in FIG. 6, the axial gap 54 between the ejector front lip 46 and the tube inner shoulder 52 may be precisely controlled during brazing by a removable shim S having a thickness corresponding to the desired axial gap 54. The shim extends between the inner shoulder 52 and the ejector 36. The shim may be provided in the form of a wrap disposed within the joined diffuser 38 and the ejector 36 with the warp extending over the lip 46. Once the shim has been properly positioned, the ejector 36 may be axially pushed into the outlet tube 34 until the shim axially abut against the inner shoulder 52. Then, the ejector 36 may be brazed or otherwise suitably secured in position inside the cooling air outlet tube 34. The shim is then removed via the diffuser end 38 leaving a high precision gap between the inner shoulder 52 and the front lip 46 of the ejector 36.

The operation of the cooler 20 is as follows. The inlet hot flow impinges on the outer cylindrical wall of the cooling air outlet tube 34 and is both diffused and distributed prior to entering the heat exchanger matrix 28, which both reduces the pressure losses and improve heat exchanger performance. A small portion of the hot flow, from about 2% to about 12% depending of the ejector efficiency and back pressure, feeds the ejector 36 via the air holes 50. This portion of the hot flow expands in the gap 54 between the inner shoulder 52 and the ejector front lip 46 and follows the lip radius, from the radial direction in the gap 54 to the axial direction downstream from the lip 46, due to the Coanda effect. Intense mixing between the hot motive flow and the cold secondary flow occurs, which drives large quantities of cooling air flow through the first passage 24 and, thus, the heat exchanger matrix 28. The kinetic energy of the mixed flow is transformed in increased static pressure in the exhaust diffuser 38. The ratio between the cold flow and the hot flow is proportional to the square root of the hot stream temperature, which insures higher cooling rates at higher hot stream temperatures. The latter mentioned behaviour of the system provides for reduced temperature transients downstream from the cooler 20, which contributes to improve the life of the gas turbine components exposed to the cooled pressurized air flow supplied by the air cooler 20.

One advantage to this approach is that the air cooler is self-contained and may be installed at virtually any convenient location, e.g. in the inner bypass duct or the nacelle cowling, without requiring complex ventilation ducting. By eliminating the need for ram air scoops or additional ducting, the main bypass flow of the engine may remain unperturbed. Also low quality cooling air flow can be used, such as inner bypass duct ventilation air or nacelle ventilation air. It also reduces the cooled stream air flow temperature range due to engine power changes, which may improve the engine component life when the cold pressurized air is used for component cooling. Additionally, the lack of moving components contributes to ensure a long service life of the unit.

The above description is meant to be exemplary only, and one skilled in the art will recognize that changes may be made to the embodiments described without departing from the scope of the invention disclosed. For example, the Coanda effect-based ejector may be replaced by a central nozzle ejector. Also, the heat exchanger may take various forms and is not limited to fin-and-plate heat exchangers. For instance, the heat exchanger could be provided in the form of a tubular heat exchanger. Still other modifications which fall within the scope of the present invention will be apparent to those skilled in the art, in light of a review of this disclosure, and such modifications are intended to fall within the appended claims.

What is claimed is:

1. A method of installing an ejector in a pipe having an axis, the pipe having an annular inner shoulder projecting radially inwardly from an inner surface of a wall of the pipe, and a circumferential array of holes extending through the wall of the pipe at an axial location comprised between the annular inner shoulder and a terminal end of the pipe, the ejector having an annular front lip, the method comprising: positioning a shim between the annular inner shoulder and the annular front lip, the shim having a thickness corresponding to a desired axial gap between the annular inner shoulder and the annular front lip, positioning the ejector in the pipe with the shim axially abutting against the annular inner shoulder and the annular front lip, securing the ejector in position inside the pipe, and then removing the shim from the pipe, wherein the shim is a wrap, and wherein positioning the shim comprises covering the annular front lip with the wrap prior to inserting the elector into the pipe.

2. The method defined in claim 1, wherein removing the shim comprises withdrawing the wrap from within a diffuser end of the ejector opposite the pipe.

3. The method defined in claim 1, wherein the ejector has an outer flange extending radially outwardly relative to the annular front lip, and wherein securing the ejector in position comprises brazing the outer flange of the ejector to the inner surface of the wall of the pipe.

4. The method defined in claim 3, comprising axially aligning the ejector relative to the pipe by engaging the outer flange with the inner surface of the wall of the pipe.

5. The method defined in claim 4, wherein the outer flange includes an axially extending cylindrical portion having an outer diameter generally corresponding to an inner diameter of the terminal end of the pipe.

6. The method defined in claim 5, wherein brazing comprises brazing the outer diameter of the axially extending cylindrical portion to the inner diameter of the terminal end of the pipe.

7. The method of claim 1, wherein the annular front lip defines a tip radius.

8. The method defined in claim 1, wherein removing the shim comprises withdrawing the wrap from within the ejector.

* * * * *